United States Patent [19]  [11] 4,300,052
Thawley et al.  [45] Nov. 10, 1981

[54] APPARATUS FOR EXPOSING A SERIES OF PLATES TO RADIATION

[75] Inventors: Clive S. Thawley, Dumfries, Scotland; Kenneth Graham, Saint Lukes, England; Austin Brittain, Dumfries, Scotland

[73] Assignee: Uniroyal Limited, Newbridge, Scotland

[21] Appl. No.: 119,281

[22] Filed: Feb. 7, 1980

[30] Foreign Application Priority Data

Feb. 9, 1979 [GB] United Kingdom ............... 4706/79

[51] Int. Cl.³ .......................................... H01J 37/20
[52] U.S. Cl. ............................... 250/453; 250/492.1; 250/503; 250/504 R; 248/446
[58] Field of Search ............ 250/468, 453, 454, 455, 250/492, 470, 503, 504; 248/446

[56] References Cited

U.S. PATENT DOCUMENTS 1,768,635 7/1930 Schaffner ........................... 250/453
1,809,078 6/1931 Smith ................................. 250/453

FOREIGN PATENT DOCUMENTS 504842 8/1930 Fed. Rep. of Germany ...... 248/446
2111510 11/1971 Fed. Rep. of Germany ...... 250/470
2802971 7/1978 Fed. Rep. of Germany ...... 250/468
569233 4/1924 France .............................. 250/468

Primary Examiner—Davis L. Willis
Assistant Examiner—Carolyn E. Fields
Attorney, Agent, or Firm—Charles A. Blank

[57] ABSTRACT

Apparatus for exposing a series of plates to radiation. A stack of plates 53 to be processed are placed on the surface of a first table 7 located adjacent to a second table 8. Radiation exposure means 31 above both tables are switched on and after a time equal to half the required exposure time for a single plate a carriage 45 moves to slide the top plate of the stack from the first table 7 to the second table 8, deflecting a switch operating member 52 against a biasing force. This member operates a switch causing a motor 27 through suitable transmission systems to raise the first table 7 and lower the second table 8 by equal distances until the switch operating member 52 returns to its original position under the biasing force. After a further period equal to half the required exposure time for a single plate the next plate is transferred from the first table 7 to the second table 8 and the process is continued automatically until all plates have been exposed, half the exposure having occurred while supported on the first table and half while on the second table.

4 Claims, 8 Drawing Figures

APPARATUS FOR EXPOSING A SERIES OF PLATES TO RADIATION

This invention relates to apparatus for exposing a series of plates to radiation.

There are many fields where a plurality of plates need to be exposed in sequence to a source of radiation and it is an object of the invention to provide apparatus capable of doing this with a small amount of manual labour and in a time-saving manner.

According to the invention apparatus for exposing a series of plates to radiation comprises a first table having a surface for supporting a stack of plates, a second table located adjacent to the first table and also having a surface for supporting a stack of plates, first drive means for raising the first table by a succession of predetermined increments, second drive means for lowering the second table by a succession of predetermined increments equal to those by which the first table is raised, a radiation exposure means located above at least one of the tables and means for sliding a plate from a location wherein it is supported from the surface of the first table to a location wherein it is supported from the surface of the second table.

The only manual operations necessary are the loading of a stack of plates on to the first table and removal of the exposed stack from the second table. The acts of radiation and of transfer from one table to the other can take place automatically within the apparatus under the control of suitable control means.

Preferably the radiation exposure unit extends above the whole of the surface of each table. With this arrangement the uppermost plates on both stacks are exposed simultaneously to radiation and this can considerably cut down the time of operation. Thus, any particular plate may receive half of its required radiation while at the top of the stack on the first table, and the second half of the required radiation after having been transferred to the top of the stack on the second table.

The means for raising the first table and for lowering the second table preferably each comprises a screw jack. The means for sliding a plate from the first to the second table preferably comprises plate engaging means secured to a carriage driven to reciprocate in the required direction by a further screw jack assembly. All movements are thus made mechanically and can be controlled with a high degree of accuracy.

The apparatus will incorporate timing means, limit switches and a control circuit which is designed to ensure that the apparatus operates in correct sequence.

In order that the invention may be better understood a specific embodiment thereof will now be described in more detail, by way of example only, with reference to the accompanying drawings in which:-

Figure 1:
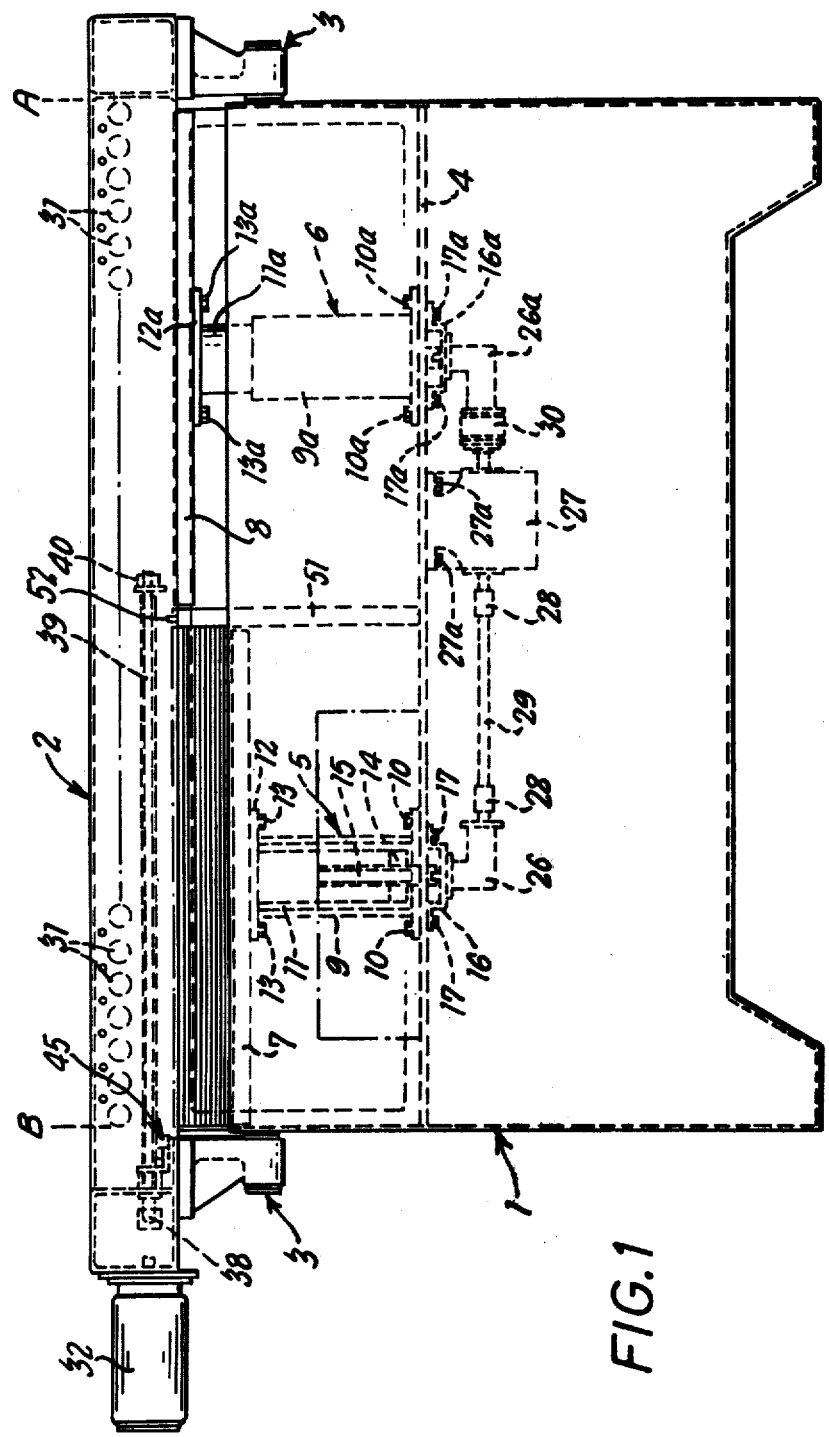
FIG. 1 is a front elevation of the apparatus with parts cut away.

The apparatus comprises a housing generally shown as 1, the housing having an open top which may be closed by a lid 2 pivotally mounted on the housing about pivots 3. The housing includes a horizontal mounting plate 4 above which are secured two screw jack assemblies of equal pitch shown generally as 5 and 6 respectively, the two assemblies supporting, and forming drive means for, first and second tables 7 and 8 respectively.

The screw jack assemblies 5 and 6 are identical and only assembly 5 will be described in detail. The assembly 5 comprises a hollow guide cylinder 9 secured by bolts 10 to the mounting plate 4. Slidably mounted within the cylinder 9 is a piston element 11 which is keyed to the cylinder to ensure that it is only capable of axial movement and not rotation relative to the cylinder. A plate 12 is welded to the upper end of the piston 11 and the table 7 is secured to the plate 12 by bolts 13. At its inner end the piston has secured thereto a nut 14 which engages the external threads on a drive spindle 15. The lower end of the spindle 15 passes through a hole in the mounting plate 4 and through the bore of a thrust support element 16 secured by bolts 17 beneath the mounting plate 4. The element 16 has an inwardly directed flange 18 on the upper surface of which is supported a thrust ball bearing 19 surmounted by a washer 20 and circular clip 21 engaging a shoulder on the spindle 15. The spindle 15 is thus supported vertically by the thrust bearing 19. Below the flange 18 are thrust and packing washers 22 secured in place on the spindle 15 by a further circular clip 23. The lower end of the spindle has an opening 24 into which is inserted a non-circular drive spindle 25 from a bevel gearbox 26. The gearbox is not shown sectioned as this can take any conventional form. Parts associated with the jack assembly 6 which correspond to those of the jack assembly 5 are shown by the same reference numerals as for the assembly 5, with the addition of the suffix a.

The two jack asemblies 5 and 6 are driven from a common electric motor 27 secured by bolts 27a to the underside of the mounting plate 4. The motor 27 drives the bevel gearbox 26 through couplings 28 and a shaft 29 and drives the bevel gearbox 26a through a reversing gearbox 30. The presence of the reversing gearbox 30 ensures that the drives to the two screw jacks are counter-rotating and thus as the motor operates the tables 7 and 8 move in opposite directions. The gearboxes are such that the jacks are driven at equal speeds and this, with the equal pitch of the jacks means that as table 7 is raised, table 8 is lowered, at the same rate, and vice-versa.

Mounted within the lid are radiation exposure means and means for sliding a plate from the first table 7 to the second table 8. The radiation exposure means comprises a plurality of ultra-violet tubes, of which a representative selection are shown at 31. It will be understood that these tubes are arranged in parallel relationship along the full length of the housing between the limits A and B shown in FIG. 1, and each tube extends over the full width of the tables as indicated by the single tube shown in FIG. 2. The electrical control apparatus for these tubes may be mounted in the lid or in the housing and is not shown in the drawings.

Figure 2:
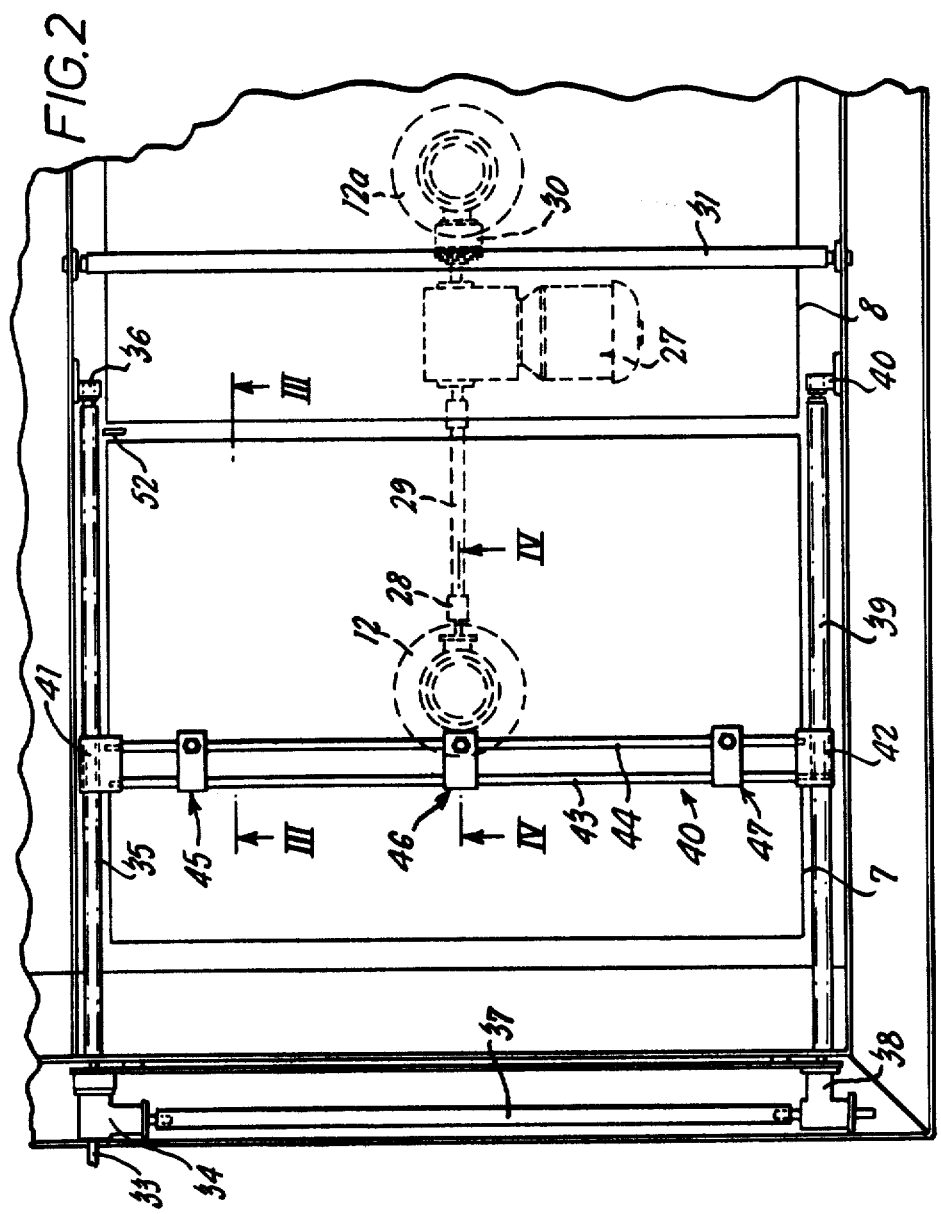
FIG. 2 is a fragmentary plan view of the apparatus of FIG. 1, again with parts cut away for clarity.
Figure 3:
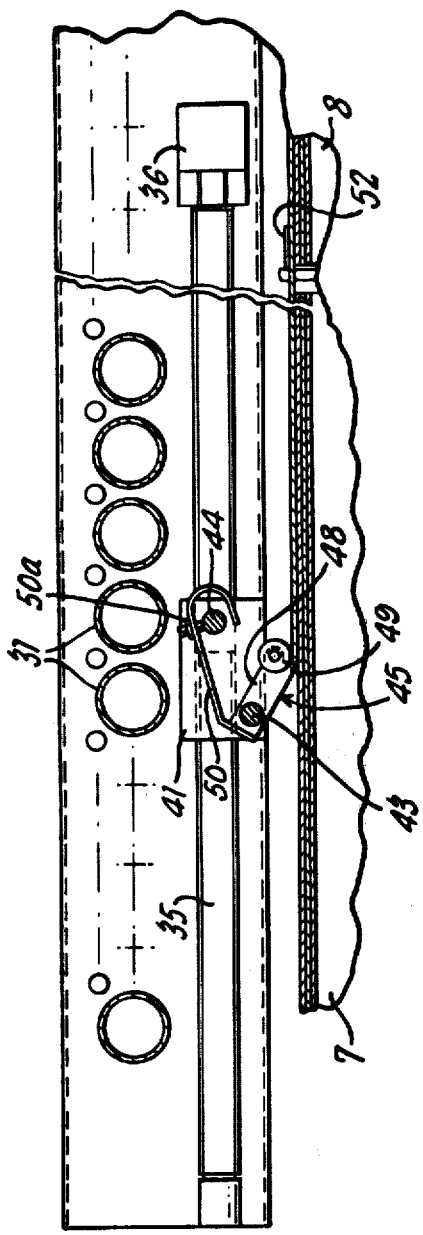
FIG. 3 is a schematic cross-section on the line III—III of FIG. 2.
Figure 4:
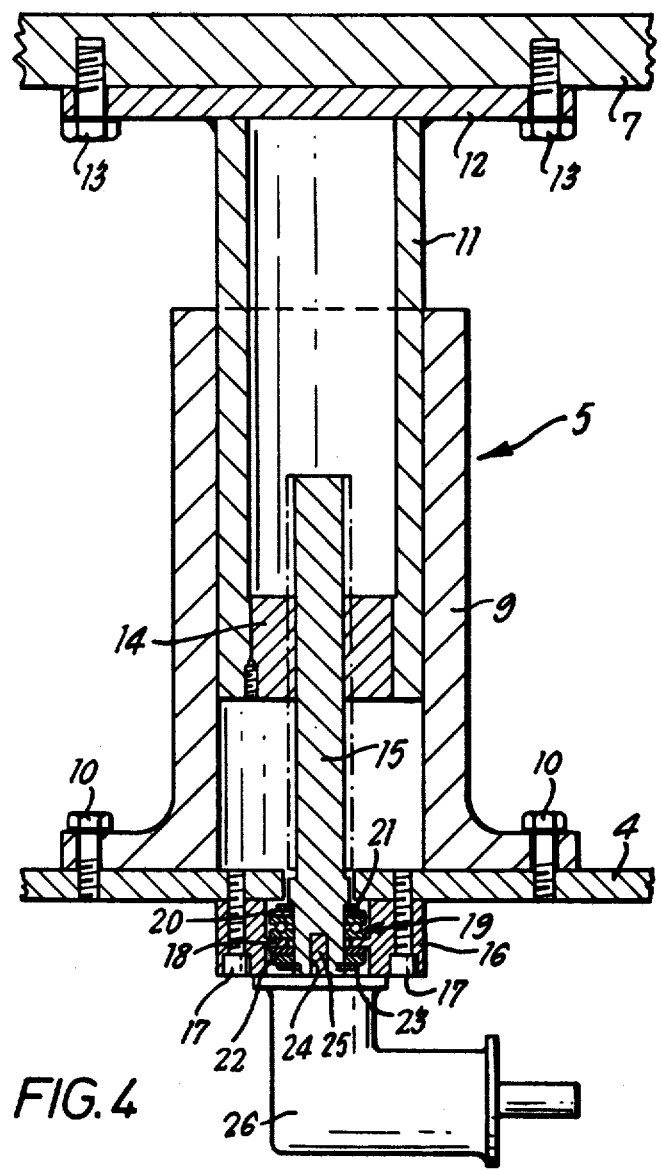
FIG. 4 is a partial cross-section on the line IV—IV of FIG. 2.

At one side of the lid there is supported an electric motor 32 for effecting sliding movement of the plates from the first to the second table. The motor 32 (not shown in FIG. 2) drives a shaft 33 to a coupling 34. From the coupling 34 there extends an externally threaded drive spindle 35 supported at its remote end by a bearing 36 secured to the lid. Also extending from the coupling 34 is a drive shaft 37 which, through a further coupling 38 drives a second externally threaded driving spindle 39, the free end of which is supported in a bearing 40. The two driving spindles 36 and 39 drive a carriage shown generally as 40 and comprising two nuts, 41 and 42 each engaging a respective one of the spindles and having extending therebetween two rods 43 and 44. Three sets of plate engaging means 45, 46 and 47 are mounted on the carriage. Each plate engaging means comprises an arm 48 which is free to pivot about the rod 43 and which has a plate engaging nose 49 at its lower extremity. Extending forwardly and upwardly from the arm 48 is a sheet 50 which extends around the rod 44. An adjusting screw and nut assembly 50a is provided on each sheet 50, and engagement of the screw with the rod 44 limits the downward movement of the nose 49. The screws are set so that the nose 49 can engage one and one only of a stack of plates supported on the table 7, as is shown clearly in FIG. 3.

Figure 8:
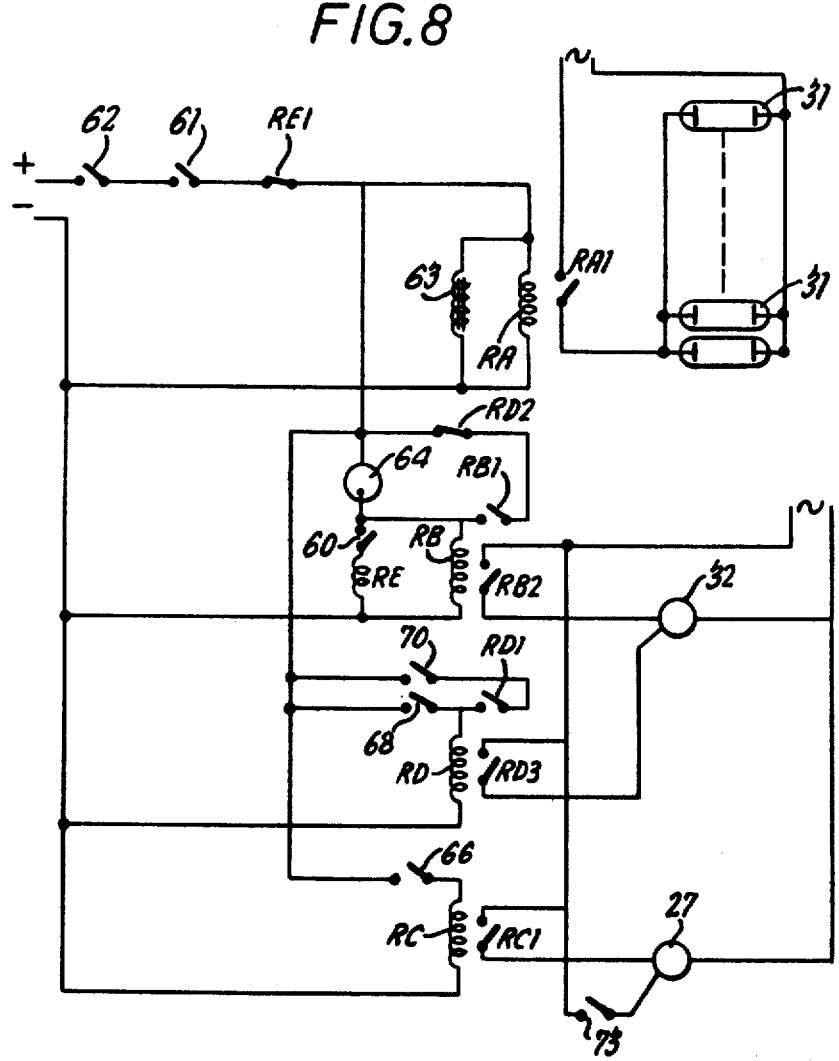
FIG. 8 is a diagram of a schematic control circuit.

Positioned between and adjacent to the junction of the two tables 7 and 8, and mounted on a vertical dividing wall 51 of the housing is a switch 66 having a switch operating member 52 which is pivotal about a vertical axis. The operating member is biased to the position shown in FIG. 2, lying in the path of a sliding plate, by a coil spring (not shown) around its pivot. The switch is connected to an electrical control circuit, which may be of conventional construction, a simplified form of which is shown schematically in FIG. 8. Clearly other circuitry can be designed which will give the control functions required for the apparatus to operate as will now be described.

Figure 5:
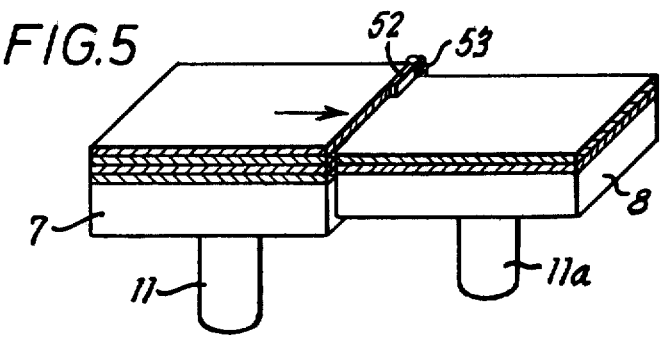
FIGS. 5, 6 and 7 illustrate schematically the method of operation of the apparatus.
Figure 6:
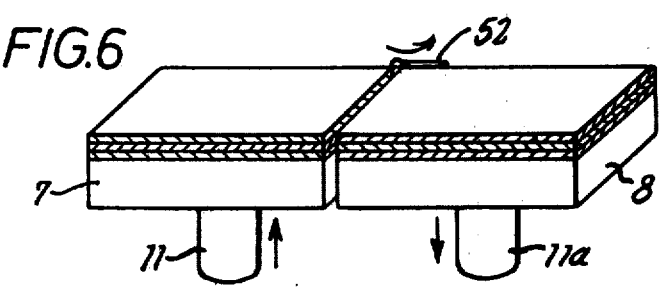

To process a stack of plates in the apparatus the lid is first opened on its pivots 3 by raising the front edge of the lid. The pivots are set well back from the axis of the motor 32 and drive spindle 35 so that opening of the lid gives completely free and unhindered access to the first part of the housing in which the tables 7 and 8 are accommodated, and exposes the whole surface area of each table. In this initial condition the table 7 is in its lowermost position and the table 8 in its uppermost position as shown in FIG. 1. The table incorporates a microswitch 60 which is open as long as one plate is on the table, but closed when all plates are removed. The lid is then lowered and when properly closed it closes safety switch 61. Closing of the main control switch 62 then energizes a solenoid 63 acting to lock the lid closed, energizes relay RA, the contacts RA1 of which close to complete a circuit to the ultraviolet tubes 31 so causing irradiation of the upper surface of the uppermost plate of the stack on table 7 and starts the timer 64. After a pre-set delay equal to half the required exposure time for an individual plate, the timer produces an output signal to energize relay RB, closing holding contacts RB1 and closing contacts RB2 completing a circuit to the motor 32 which rotates drive spindles 35 and 39 so moving the carriage to the right, allowing limit switch 70 to close, and causing the elements 45, 46 and 47 to engage the edge of the uppermost plate of the stack on table 7 and move from their far left-hand position (as seen in the Figures) to their far right-hand position (as seen in the Figures). This movement has the effect of sliding the uppermost plate from the stack on table 7 on to the top of the table 8. As such movement is initiated the leading edge of the sliding plate engages the switch operating member 52 and pivots this from the position shown in FIG. 5 to the position shown in FIG. 6. Movement of the switch operating member to the FIG. 6 position closes the switch 66, energising relay RC, the contacts RC1 of which close to complete a circuit to the motor 27 to drive the screw jack means 5 and 6 in directions such that the table 7 moves upwardly and simultaneously the table 8 moves downwardly. When the carriage 40 reaches its right-hand limit position a limit switch 68 is closed, which energizes relay RD, closing holding contacts RD1, opening contacts RD2 to de-energize relay RB and closing contacts RD3 to cause motor 32 to reverse and so return the carriage to its limit left-hand position. On reaching that position the limit switch 70 is opened to de-energize relay RD. The presence of the stop members 50a engaging the rod 44 ensures that the elements 45, 46 and 47 do not contact the top plate on the stack on table 7 during this return movement.

Figure 7:
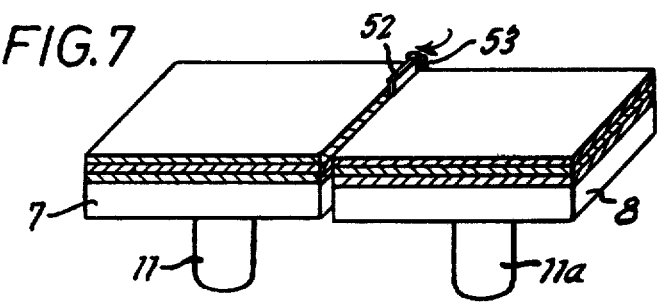

During the return movement the relative vertical movement between the two tables has been continuing, the movement of the tables taking place at the same speed but in opposite directions. The tables thus pass through the relative positions shown in FIG. 6 where the upper surfaces of the plates on each stack are coplanar until they reach the relative position shown in FIG. 7 where the table 8 has been lowered by such an amount that the switch operating member 52 is free to pivot back to its original position under the effect of the spring biasing force of spring 53. Return of the switch to this position opens switch 66 so de-energizing relay RC and stopping the motor 27 so that further movement of the tables ceases.

This part of the cycle is completed in less than half the required exposure time for each plate and exposure then continues for the remainder of that period. During this period it will be apparent that the plate on table 8 receives sufficient radiation to complete its required exposure, while the new uppermost plate on table 7 receives half its required radiation. After this further delay the timer produces a further signal to initiate a further transferring movement of the uppermost plate from the table 7 to table 8 and further relative vertical movement of the two tables as already described. This process continues automatically until all plates on the table 7 have been transferred to the table 8, whereupon the switch 60 closes. After a final time delay from the last transfer equal to half the required plate exposure time (at which the exposure of the last plate on table 8 is complete) the next signal from the timer thus energizes relay RE opening contacts RE1 to break the control circuit, switch off the ultra-violet tubes and release the lid lock. The lid can then be opened and the exposed stack of plates removed from the apparatus. The motor 27 may then be reversed by closing an independent operating switch 73, capable of operation only when the main control switch 62 is open, to lower table 7 and raise table 8 to their original positions, whereupon a further stack of plates to be processed may be placed on table 7 and the process repeated as described.

It will be understood that the apparatus described may be modified in many different ways. In particular the vertical drive means for the two tables may be varied from the screw jacks shown and may be replaced by other mechanical or by hydraulic or pneumatic drive. Similarly the mechanism for sliding the uppermost plate from the table 7 to the table 8 may be varied and again this may be of mechanical, hydraulic or pneumatic form. The plate transfer mechanism could be mounted on the housing rather than in the lid. Although the switch operating member 52 forms a simple and effective way of sensing the required vertical positions of the tables it could be replaced by other sensing means. In particular photoelectric sensing means could be used for effecting such control. The whole of the sensing and control arrangements may be designed differently from those described. The apparatus has been described as comprising ultra-violet tubes for producing the required radiation, but it will be apparent that these could be replaced by other radiation sources. If the saving of time effected by irradiating the uppermost plates on both tables simultaneously is not required then the radiation exposure means may be confined to the area above either the first or second table only. Other modifications will be apparent to one skilled in the art.

We claim:

1. Apparatus for exposing a series of plates to radiation, the apparatus comprising a first table having a surface for supporting a stack of plates, a second table located adjacent to the first table and also having a surface for supporting a stack of plates, first drive means comprising a screw jack for raising the first table by a succession of predetermined increments, second drive means comprising a screw jack for lowering the second table by a succession of predetermined increments equal to those by which the first table is raised, radiation exposure means located above at least one of the tables and means for sliding a plate from a location wherein it is supported from the surface of the first table to a location wherein it is supported from the surface of the second table, the screw jacks being of equal pitch and the apparatus including a common prime mover for driving the screw jacks, the drive arrangement being such that the jacks are driven at equal speeds, and the apparatus including control means for controlling the prime mover to operate for a predetermined time during which the jacks drive the tables through the required predetermined increments, the control means including switch means having an operating member pivotally mounted adjacent to the juncture of the two tables and biased to a first limit position projecting into the path of sliding of the plates from the first to the second table, the operating member being pivotable from the first limit position to a second limit position by contact with a plate as the plate commences its sliding movement to actuate the switch means to start operation of the prime mover and, when not restrained by contact with a plate, being pivotable back to the first limit position under the action of the biasing force to actuate the switch means to stop operation of the prime mover.

2. Apparatus according to claim 1 in which the means for sliding a plate from the first to the second table comprises plate-engaging means secured to a carriage driven to reciprocate in the required direction by a further screw jack assembly.

3. Apparatus according to claim 2 in which the plate-engaging means comprises a plurality of arms engageable with an edge of the plate to effect the sliding movement, the arms being supported so that they do not contact the surface of a succeeding plate during return of the carriage.

4. Apparatus according to any one of the preceding claims in which the first and second tables and drive means are supported in a housing, and the radiation exposure means and plate sliding means are supported in a lid pivotally mounted on the housing to move between a closed position closing the top of the housing and an open position exposing the full surface area of each table.

* * * * *